United States Patent [19]
Miess et al.

[11] Patent Number: 5,462,643
[45] Date of Patent: Oct. 31, 1995

[54] METHOD FOR REPROCESSING SOLVENT MIXTURES CONTAINING CONSTITUENTS OF LOW VOLATILITY AND APPARATUS SUITABLE THEREFOR

[75] Inventors: Georg-Emerich Miess, Regensburg; Peter M. Roth, Eppstein; Karl Heinrich, Grossaitingen; Siegfried Rewitzer, Ihrlerstein, all of Germany

[73] Assignee: Hoechst Aktiengesellschaft, Germany

[21] Appl. No.: 257,638

[22] Filed: Jun. 9, 1994

[30] Foreign Application Priority Data

Jun. 12, 1993 [DE] Germany ............. 43 19 534.2

[51] Int. Cl.$^6$ .................. B01D 1/00; B01D 3/00
[52] U.S. Cl. ............. 203/72; 159/5; 159/49; 159/DIG. 10; 159/DIG. 16; 202/154; 202/205; 203/73; 203/78; 203/DIG. 9; 548/555
[58] Field of Search ............. 159/47.1, 5, 13.1, 159/49, DIG. 10, DIG. 16, DIG. 8; 203/DIG. 9, 72, 73, 14, 78, DIG. 16; 202/236, 153, 205, 158, 154; 548/555

[56] References Cited

U.S. PATENT DOCUMENTS

| | | | |
|---|---|---|---|
| 4,141,799 | 2/1979 | Thelen et al. | 159/6.2 |
| 4,308,112 | 12/1981 | Jupe et al. | 203/80 |
| 4,317,926 | 3/1982 | Sato et al. | 203/72 |
| 4,323,431 | 4/1982 | Takahashi et al. | 202/153 |
| 4,652,343 | 3/1987 | Sridhar | 203/70 |
| 5,252,187 | 10/1993 | Ohtsu et al. | 159/47.1 |

FOREIGN PATENT DOCUMENTS

| 1669559 | 1/1971 | Germany . |
|---|---|---|
| 2422814 | 2/1974 | Germany . |

OTHER PUBLICATIONS

Patent Abstracts of Japan, vol. 11, No. 18 Jan, 17, 1987.

*Primary Examiner*—Virginia Manoharan
*Attorney, Agent, or Firm*—Connolly & Hutz

[57] ABSTRACT

Reprocessing mixtures which contain organic solvents and constituents of low volatility and may contain water: includes introducing the mixture into a concentration apparatus of a solvent recovery system, concentrating the mixture in the concentration apparatus by evaporating off a portion of a readily volatile fraction and feeding this readily volatile fraction to a separation column. A portion of the concentrated mixture from the concentration apparatus is conducted away into a separation apparatus where the constituents of low volatility are separated off from the concentrated mixture and ejected from the solvent recovery system. The concentrated mixture is conducted away, freed from the constituents of low volatility, from the separation apparatus.

14 Claims, 1 Drawing Sheet

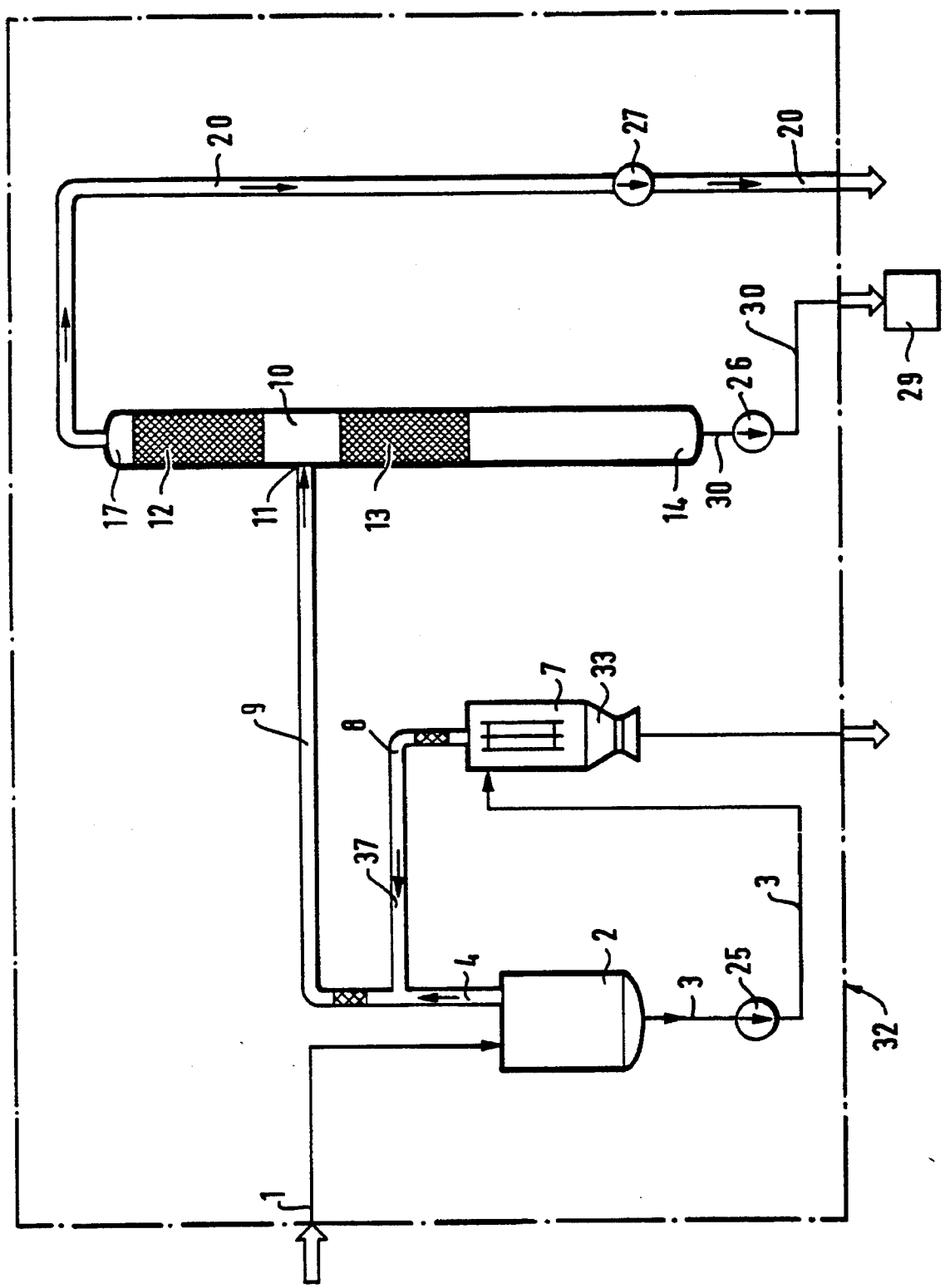

METHOD FOR REPROCESSING SOLVENT MIXTURES CONTAINING CONSTITUENTS OF LOW VOLATILITY AND APPARATUS SUITABLE THEREFOR

The present invention relates to a process for reprocessing solvent mixtures containing constituents of low volatility, in particular salts, and an apparatus adapted for carrying out this process. The process and the apparatus are particularly suitable for reprocessing aqueous solvent mixtures which contain constituents of low volatility and/or salts.

In the production and aftertreatment of spun fibers, aqueous solutions arise which, in addition to organic solvents, contain salts and/or other impurities of low volatility. Conventionally, the contaminated spinning solvent is collected after the actual spinning process and/or an aftertreatment of the spun fibers, such as drawing, washing or setting, and purified in a solvent recovery system. Subsequently thereto, the reprocessed solvent is generally fed to the spinning process and/or aftertreatment process. Examples of previously known reprocessing methods can be found in Kirk-Othmer: "Encyclopedia of chemical Technology", Vol. 21, $3^{rd}$ Edition, John Wiley & Sons (1983), headword "Solvent Recovery", p. 357.

In recent years, the requirements of the operation of plants in which spun fibers are produced and/or aftertreated have become increasingly stricter. This relates both to the restriction of the emission of chemical substances which are caused by the operation of such plants and to the consumption of energy or raw materials in the operation of these plants.

The reprocessing, in particular, of aqueous mixtures from spinning plants which have a high content of constituents of low volatility, such as salts, has proved to be difficult.

Salts are added at high concentrations to the spinning solution as solubilizers, in particular in the production of fibers from aromatic polyamides (aramides) soluble in organic solvents. To reuse the spinning solvent, this must be available at the highest possible purity. When the salt-containing waste waters from such spinning plants are reprocessed, it has been shown that difficulties can occur in the complete separation of salts or other constituents of low volatility of the waste waters, in particular caused by thermal damage of the solvent to be reused.

In JP-A-61-119,673, it is proposed to reprocess N-methylpyrrolidone by a combination of two columns which are operated at different pressures. This process is not highly suitable for the separation of solvent mixtures which contain solid, high-boiling constituents such as salts, since in this case frequent operating faults occur due to separation out of the solids in the columns.

The recovery of the organic solvent from salt-containing aqueous solutions is conventionally carried out by connecting an extraction stage into the solvent recovery system. Extractants such as dichloromethane are conventionally used, the reprocessing of which itself would lead to undesirable emissions or the reprocessing of which would lead in turn to an increased expenditure of energy and raw materials.

Examples of reprocessing methods by extraction are listed in JP-A-57-96,019, U.S. Pat. No. 4,859,781 or JP-A-61-238,735.

There is therefore a further requirement for processes and apparatuses by which wastes from the production or aftertreatment of spun fibers can be reprocessed with a minimum consumption of energy and raw materials and a minimum of emissions of chemical substances and by which organic solvents, in particular spinning solvents, of a high degree of purity can be recovered.

The present invention provides a process which is thermally mild and provides an apparatus adapted therefor which can be realized simply and with components which are conventional per se.

BRIEF DESCRIPTION OF THE DRAWING

The single FIGURE of drawing is a schematic illustration of a solvent recovery system, according to the present invention.

The present invention relates to a process for reprocessing mixtures which contain organic solvents and constituents of low volatility and may contain water, including the measures:

a) introducing the mixture into a concentration apparatus (2) of a solvent recovery system (32), b) concentrating the mixture in the said concentration apparatus (2) by evaporating off a portion of a readily volatile fraction and feeding this readily volatile fraction to a separation column (10), c) conducting away at least a portion of the concentrated mixture from the concentration apparatus (2) and introducing this portion into a separation apparatus (7), wherein the said constituents of low volatility are separated off from the said concentrated mixture and are ejected from the solvent recovery system (32), d) conducting away the concentrated mixture, freed from the said constituents of low volatility, from the said separation apparatus (7) and feeding the said mixture together with the readily volatile fraction from step b) to a separation column (10), e) separating the mixture from step d) in the separation column (10) into a lower-boiling fraction which is taken off over the column head (17) and a higher-boiling fraction which is removed from the column via the bottom (14), and f) conducting away at least a portion of the lower-boiling fraction obtained according to step e) and of the higher-boiling fraction from the solvent recovery system (32).

Mixtures can be reprocessed by the process according to the invention which contain organic solvents and constituents of low volatility, in particular salts, and may additionally still contain water.

The process is therefore particularly advantageous for reprocessing used spinning baths from wet spinning processes, in which are contained the solvents used to dissolve the spun polymer, the precipitant, in most cases water and in many cases high-boiling organic substances, e.g. those which are used as spinning aids, and inorganic salts.

The term "used spinning baths" also includes liquid mixtures which comprise mixtures of the actual spinning baths (precipitation baths) with other solvents originating from side streams and aftertreatment units of a spinning plant (e.g. the solvents used in the aftertreatment of the fibers and in spinneret cleaning) and water, e.g. wash waters, absorption unit water and the like.

Although the process according to the invention is also very highly suitable for the separation of purely organic high- and lower-boiling substances, it is to be described in detail below with regard to its preferred use for reprocessing used spinning baths which are particularly difficult to reprocess because of their contents of water and salts.

The organic solvents in question in this case are all solvents which are used in the production and processing of synthetic fibers. This can also include mixtures of organic solvents.

These organic solvents are preferably polar aprotic solvents, such as dimethylacetamide, dimethylformamide, N-methylpyrrolidone and dimethyl sulfoxide.

The content of organic solvents in the used aqueous mixtures arising can vary in broad ranges it is typically 10 to 85% by weight, in particular 20 to 69.9% by weight, based on the mixture of organic solvent, water and constituents of low volatility.

The content of water in the used aqueous mixtures arising can likewise vary in broad ranges; it is typically 10 to 85% by weight, in particular 30 to 79.9% by weight, based on the mixture of organic solvent, water and constituents of low volatility.

The content of the constituents of low volatility in the used aqueous mixtures arising can likewise vary in broad ranges; it is typically below 15% by weight, in particular between about 0.1 and 10% by weight, based on the mixture of organic solvent, water and constituents of low volatility.

"Constituents of low volatility" in the sense of the present invention are taken to mean all constituents of the aqueous mixture which, in comparison to the higher-boiling component of the liquid to be reprocessed, whether solvent or water, can be vaporized with difficulty or not at all. These are generally salts which have been used as solubilizers in the spinning solution or have served as processing aids in the aftertreatment stage; however, they can also be constituents, which can be vaporized with difficulty or not at all, of preparations or finishes or residues of dulling agents or pigments which arise in the aftertreatment of the fibers and are transported off with the solvent/water mixture. Examples of salts are alkali metal halides and alkaline earth metal halides such as lithium-chloride and, in particular, calcium chloride.

The constituents of low volatility can be present dissolved, suspended or dispersed in the aqueous mixture. They can also be mixtures of constituents of low volatility.

In the concentration apparatus (2), the aqueous mixture is concentrated by evaporating off a portion of a readily volatile fraction.

The concentration apparatus (2) can be any apparatus suitable for this purpose. Some examples thereof are various types of evaporators known per se, such as heated tanks, preferably having stirrers.

In order also to be able to process mixtures whose components have a tendency to decompose at a relatively long residence time at elevated temperature, or whose boiling point at atmospheric pressure is so high that no suitable heating medium is available for their evaporation, the apparatuses mentioned are expediently designed for operating at reduced pressure and/or are provided with devices which make possible evaporation of the vaporizable components at a short residence time on very hot surfaces.

A suitable apparatus is selected and operated, if necessary, under vacuum, taking into account these aspects in the individual case.

The concentration apparatus (2) is operated in such a way that at least a portion of the concentrated mixture from the concentration apparatus (2) is led off and introduced into a separation apparatus (7), wherein the said constituents of low volatility are separated off from the said concentrated mixture and ejected from the solvent recovery system (32). In a further embodiment of the process according to the invention, a portion of the aqueous mixture concentrated in the concentration apparatus (2) is returned to the said concentration apparatus (2) and subjected to a further concentration.

The ratio of the amount of concentrate led off from the concentration apparatus (2) into the separation apparatus (7) to the amount of concentrate which is led off from the concentration apparatus (2) and returned to this depends on the composition of the starting mixture to be separated and on the optimal composition of the mixture for an effective separation of the constituents of low volatility, in particular the salts, in the separation apparatus (7). In accordance with the range of variation of the starting composition and the solubility ratios of the substances of low volatility and/or of the salts in the mixture and the optimum separation concentration dependent thereon, this ratio can vary in broad ranges.

Of the aqueous mixture fed to the concentration apparatus (2), a portion of a readily volatile fraction is evaporated off and fed to a separation column (10). The weight fraction of the vaporized readily volatile fraction, based on a weight fraction of the aqueous mixture fed, can vary in broad ranges. Typical values are in the range from about 50 to 95% by weight.

In the separation column (10) the mixture principally comprising water and organic solvent is separated into a readily volatile fraction and a poorly volatile fraction. Depending on the nature of the mixture to be separated, water is taken off overhead or is enriched in the bottom product. In the preferred reprocessing of a mixture of N-methylpyrrolidone and water, water is taken off overhead and N-methylpyrrolidone arises in the bottom product.

The separation column (10) can be any apparatus suitable for this purpose. Examples thereof are distillation columns and, in particular, rectification columns having trays, dumped packings or arranged packings.

Depending on the current energy costs, it can be advantageous to carry out the separation by a multiple-stage rectification, i.e. by a plurality of columns operating in an interconnected system. The separation column (10) shown in the FIGURE also symbolizes those multiple-stage systems which comprise a plurality of columns operating in an interconnected system.

In the separation apparatus (7), the constituents of low volatility are separated from the concentrated aqueous mixture, which originates from the concentration apparatus (2), by evaporation of water and organic solvent. The remaining constituents of low volatility are ejected from the separation apparatus (7) and thus from the solvent recovery system (32).

As already explained in the description of the concentration apparatus (2), the separation apparatus (7) is also expediently designed for operating at reduced pressure and/or is provided with devices which make possible evaporation of the vaporizable components at a short residence time on very hot surfaces in order also to be able to process mixtures whose components have a tendency to decompose at a relatively long residence time at elevated temperature, or whose boiling point at atmospheric pressure is so high that no suitable heating medium is available for their evaporation.

The separation apparatus (7) can be any apparatus constructed in accordance with these aspects and thus suitable for this purpose.

Particularly advantageous here is the use of thin-film evaporators and driers of diverse type, which have devices for the mechanical removal of the nonvaporizable mixture portions from the heated evaporator surface and are preferably constructed in such a way that continuous operation is possible.

The nonvaporizable constituents of the mixtures are generally solids, e.g. the abovementioned salts or are highly viscous liquids or pasty substances which are taken off from the separation apparatus (7) via known suitable locks, the lock contents being able to be flushed out of the lock, if required, by a suitable flushing liquid (in the case of salts, e.g. by water).

The concentrated mixture freed from the said constituents of low volatility is conducted off from the separation apparatus (7) and fed to a separation column (10), this mass stream being combined if required before the introduction into the separation column (10) with the readily volatile fraction originating from the concentration apparatus (2).

The supply to the separation column (10) of the concentrated mixture freed from the said constituents of low volatility is preferably carried out via a feed (11) which is mounted at the height of the column body at which the composition of the respective fraction in the interior of the column roughly corresponds to the composition of the feed mixture.

At least the concentration apparatus (2) or the separation apparatus (7) or the separation column (10) are particularly preferably operated under vacuum. A particularly gentle reprocessing of the organic solvent can be achieved in this way.

To carry out the process according to the invention, separation apparatuses which are known per se and conventional are combined in a simple manner to give one apparatus.

The invention also relates to a solvent recovery system (32) for reprocessing mixtures which contain organic solvents, constituents of low volatility, in particular salts, and may contain water, including a concentration apparatus (2), a separation apparatus (7) and a separation column (10) which are connected together and through which mass streams flow in the following manner:

A) feedline (1) which opens out into the concentration apparatus (2) and serves for introducing a mixture into the concentration apparatus (2) of the solvent recovery system (32), B) outlet line (4) for conducting off a vaporized readily volatile fraction from the said concentration apparatus (2) and for supplying this fraction to a separation column (10), C) outlet line (3) for conducting off the concentrate comprising the higher-boiling constituents of the solvent mixture from the concentration apparatus (2), which outlet line (3) opens out into a separation apparatus (7), D) lock (33) for discharging from the solvent recovery system (32) the constituents of low volatility separated off in the separation apparatus (7), E) outflow line (8) for the concentrate purified by removal of the said sparingly soluble constituents in the separation apparatus (7), which outflow line opens out directly into the separation column (10) or into the outlet line (4) for conducting off a vaporized readily volatile fraction from the concentration apparatus (2) and opens out together with this into the separation column (10), F) line (20) for leading off the resulting condensate from the separation column (10), and G) outflow line (30) via which the higher-boiling fraction obtained in the separation column (10) is removed from the bottom (14) and which serves for ejecting the higher-boiling fraction from the solvent recovery system (32).

Particularly preferred embodiments of the apparatus according to the invention are defined in claims 11 to 14.

In the FIGURE, the present invention is described by way of example. In this FIGURE is depicted a diagram of the principle of the process according to the invention and the apparatus according to the invention.

An aqueous solvent mixture is fed from a spinning apparatus, not shown, to a reprocessing unit via a feedline (1) of a solvent recovery plant (32). This solvent mixture, in addition to water, contains the spinning solvent in question, for example dimethylacetamide or N-methylpyrrolidone, and dissolved or suspended or dispersed constituents of low volatility, such as constituents of preparations or finishes and, in particular, salts.

The feedline (1) opens out into a concentration apparatus (2) in which the solvent mixture is concentrated by evaporating off a portion of a readily volatile fraction which, in the case of an NMP/water mixture, principally contains water. The vaporized readily volatile fraction is conducted away via the line (4) and supplied to a separation column (10) which is constructed, in particular, as a rectification column.

The concentrate comprising the higher-boiling constituents of the aqueous solvent mixture is conducted away via the outlet line (3) from the concentration apparatus (2) and supplied to a separation apparatus (7). This is, in particular, a thin-film evaporator. In the separation apparatus (7), constituents of low volatility are separated off from the concentrate and removed from the solvent recovery system (32), usually via the lock (33); the constituents of low volatility are, in particular, salts which are dissolved or suspended or dispersed in the concentrate.

All units (2), (7) and (10) are fitted out with manometers for monitoring the working pressures.

The concentrated mixture freed from the said constituents of low volatility is conducted off from the separation apparatus (7) via line (8) and fed to a separation column (10) together with the lower-boiling fraction from the concentration apparatus (2). This is performed via line (9) and via a feed (11), which is mounted at the height of the column body at which the composition of the respective fraction in the interior of the column roughly corresponds to the composition of the feed mixture. The separation column (10) has conventional trays and/or packing layers (12) and (13). In the separation column (10), the liquid mixture supplied via the feed (11) is divided into a lower-boiling fraction and a higher-boiling fraction. The lower-boiling fraction, which in the case of an NMP/water mixture comprises water, is taken off via the column head (17) via a line (20) and at least a portion of this lower-boiling fraction is conducted away from the solvent recovery system (32) and is conventionally fed to a biological effluent treatment plant. A further portion of the lower-boiling fraction produced can be returned to the separation column (10) in a manner known per se in order there to establish a defined distillate composition.

The higher-boiling fraction is produced in the bottom (14) of the separation column (10) and is removed from the separation column (10) and from the solvent recovery system (32) via an outflow line (30). This fraction is then reused, preferably, in the spinning apparatus.

The individual mass streams are transported and controlled via pumps in the individual feedlines and outlet lines. In the FIGURE, pumps (25), (26) and (27) are shown diagrammatically.

We claim:

1. A method for reprocessing mixtures which contain organic solvents and constituents of low volatility, comprising the steps of:
a) introducing the mixture into a concentration apparatus of a solvent recovery system,
b) concentrating the mixture in the concentration apparatus by evaporating a portion of a volatile fraction and feeding this portion of a volatile fraction to a separation column,
c) conducting at least a portion of the concentrated mixture from the concentration apparatus and introducing this portion into a separation apparatus, wherein the constituents of low volatility are separated from the concentrated mixture and are ejected from the solvent recovery system,
d) conducting the concentrated mixture, freed from the constituents of low volatility, from the separation apparatus and feeding the mixture together with the portion of the volatile fraction from step b) to the separation column,
e) separating the mixture from step d) in the separation column into a lower-boiling fraction which is removed via the column head and a higher-boiling fraction which is removed via the column bottom, and
f) removing at least a portion of the lower-boiling fraction obtained according to step e) and of the higher-boiling fraction from the solvent recovery system.

2. The method as claimed in claim 1, wherein the mixture to be reprocessed is an aqueous mixture which contains 10 to 85% by weight organic aprotic solvent, 10 to 85% water and less than 15% by weight salts.

3. The method as claimed in claim 2, wherein the organic aprotic solvent is N-methylpyrrolidone.

4. The method as claimed in claim 2, wherein the salt is calcium chloride.

5. The method as claimed in claim 1, wherein the concentration apparatus used is an evaporator.

6. The method as claimed in claim 1, wherein a portion of the mixture concentrated in step b) is returned to said concentration apparatus.

7. The method as claimed in claim 1, wherein the separation column used is a rectification column.

8. The method as claimed in claim 1, wherein the separation apparatus used is a thin-film evaporator.

9. The method as claimed in claim 1, wherein at least one of the concentration apparatus, the separation apparatus or the separation column is operated under vacuum.

10. A solvent recovery system for reprocessing mixtures which contain organic solvents and constituents of low volatility, comprising: a concentration apparatus, a separation apparatus, and a separation column connected together, means for introducing mixtures into the concentration apparatus of the solvent recovery system, means for conducting a vaporized volatile fraction from the concentration apparatus and for supplying this fraction to the separation column, means for conducting a concentrate comprising a higher-boiling constituents of the mixtures from the concentration apparatus, which means opens into the separation apparatus, a lock connected to the separation apparatus for discharging from the solvent recovery system the constituents of low volatility separated in the separation apparatus, an overflow line for the concentrate purified by removal of the constituents of low volatility in the separation apparatus, which overflow line connects directly into the separation column or into the means for conducting a vaporized volatile fraction from the concentration apparatus, whenever the overflow line and the means are connected together into the separation column, a means for leading a condensate from the separation column, and means for removing the higher-boiling fraction obtained in the separation column from the bottom and for ejecting the higher-boiling fraction from the solvent recovery system.

11. The solvent recovery system as claimed in claim 10, wherein the concentration apparatus is an evaporator.

12. The solvent recovery system as claimed in claim 10, wherein the separation column is a rectification column.

13. The solvent recovery system as claimed in claim 10, wherein the separation apparatus is a thin-film evaporator.

14. The solvent recovery system as claimed in claim 10, wherein the overflow line for the concentrate purified in the separation apparatus by removal of the constituents of low volatility is conducted via a feedline into the separation column, the feedline being mounted at the height of the column body at which the composition of the respective fraction in the interior of the column corresponds to the composition of the fed mixture.

* * * * *